Oct. 22, 1946.    B. G. MARTIN    2,409,875
GYRO ASSEMBLY
Filed July 26, 1944    2 Sheets-Sheet 1

INVENTOR.
BOYD G. MARTIN
BY
Frank H. Harmon
ATTORNEY

Oct. 22, 1946.　　　B. G. MARTIN　　　2,409,875
GYRO ASSEMBLY
Filed July 26, 1944　　　2 Sheets-Sheet 2

INVENTOR.
BOYD G. MARTIN
BY
*Frank A. Harmon*
ATTORNEY

Patented Oct. 22, 1946

2,409,875

UNITED STATES PATENT OFFICE 2,409,875

GYRO ASSEMBLY

Boyd G. Martin, Shaker Heights, Ohio, assignor, by mesne assignments, to Jack & Heintz Precision Industries, Inc., Cleveland, Ohio, a corporation of Delaware Application July 26, 1944, Serial No. 546,649

6 Claims. (Cl. 74—5)

This invention relates to gyroscopic devices and has as one of its primary objects to provide in conjunction with a gyro assembly mounted for three degrees of mechanical freedom of movement throughout 360° a means for maintaining a true predetermined gyro rotor spin axis regardless of the plane or extent of displacement of the body sought to be stabilized by carrying the gyro assembly.

As applied to aeronautics, for example in connection with such an instrument as a gyro bank and climb indicator, an object of the invention is to provide a positive means for maintaining a perfectly true vertical rotor spin axis regardless of the maneuver of the airplane or any combination of maneuvers or degrees thereof.

The conventional airplane gyro bank and climb indicators are imposed with limits of degree of maneuver of the airplane. Such maneuvers as vertical dives or climbs, loops or barrel rolls cause the gyro rotor to become upset and the instrument is useless until it is manually reset by a gyro caging device after the airplane has been restored to level flight. Such a standard gyro horizon indicator has a normally vertical gyro rotor spin axis, a rotor housing, or inner gimbal, axis at right angles to the spin axis and an outer gimbal axis in bearings in the airplane itself and which axis is at right angles to the inner gimbal axis and normally at right angles to the spin axis. The inner and outer gimbals of such standard instruments are not free to turn 360° about their axes. This permits climb and dive angles up to approximately 70° from horizontal and banks up to 120° from horizontal before the rotor is upset and proper attitude indication lost.

If the conventional bank and climb instrument is modified so as to provide the inner and outer gimbals with 360° of mechanical freedom it would be possible to put the airplane in a barrel roll maneuver without upsetting the rotor. However, inasmuch as the outer gimbal is pivoted in the airplane itself, vertical climbs and dives and loops would bring the outer gimbal axis in alignment with the rotor spin axis, a condition in which the universal mounting is lost, a torque may be applied to the rotor axis and it may precess from the vertical.

As stated before, the primary object is to provide a positive means for preventing any upset of the rotor spin axis. In more concise terms the primary object is to provide means for maintaining the support for the outer gimbal normal to the spin axis of the gyro rotor and for preventing the gyro rotor spin axis from becoming aligned with the axis of rotation of the gimbal frame for supporting the outer gimbal, which condition would leave the rotor susceptible to upset or precession from the vertical upon the application of torque.

The object of the provision of such a device is to provide a gyro assembly which will insure the proper operation of such instruments as artificial gyro horizons, directional gyros, magnetic compasses utilizing gyros or such control devices as automatic pilots or those requiring a steady level platform or reference or those used for gun fire control, etc.

Such a stabilization means in an airplane gyro assembly, as long as it is capable of stabilizing and maintaining the support for the outer gimbal normal to the rotor spin axis and of preventing the rotor spin axis from becoming aligned with the axis of the gimbal for supporting the outer gimbal, may take any one of a number of forms such as means for balancing with shifting weights or mercury ballistics; valved flow of fluid to oppose gimbal movement when it approaches the critical angle of undesired alignment or the use of an electrical system with contact for closing the circuit.

In the provision of a gyro stabilization device for such gyroscopic instruments as gyro horizon, or bank and climb indicators, it is herewith proposed to provide a gyro assembly to include a gyro rotor housing, or inner gimbal, with 360° of freedom in an outer, or second, gimbal, mounted for 360° of freedom in a third gimbal. The third gimbal is mounted in case bearings with 360° of freedom with its axis in alignment with that of the rotor housing or inner gimbal. The stabilizing device for such an assembly may preferably be in the form of an auxiliary vertical spin gyro rotor whose housing, or inner gimbal axis is parallel to that of the second gimbal of the main assembly. The outer gimbal of the auxiliary assembly is rigid with the third gimbal and rotates in one case bearing in alignment with the case bearing for supporting the third gimbal. Such a form of mounting allows the airplane to roll, pitch and yaw about the spinning rotor without applying any unreasonable torque to the main rotor spin axis. Thus, the gyroscopic rigidity of the main rotor primarily maintains the main rotor axis truly vertical within its gimbal assembly while the auxiliary gyro, through the rigidity between its outer gimbal and the third gimbal, maintains the third gimbal normal to the spin axis of the main rotor. In this manner the third gimbal provides a floating platform for the main gyro assembly and the auxiliary gyro stabilizes the platform irrespective of the nature and extent of airplane maneuver. A conventional pendulous vane assembly may be used to make limited corrections when the axis strays from the vertical. From this vertical reference is established the horizon bar.

With the foregoing and other objects in view the invention resides in the combination of parts set forth in the following specification and appended claims, certain embodiments thereof being illustrated in the accompanying drawings, in which:

Figure 1:
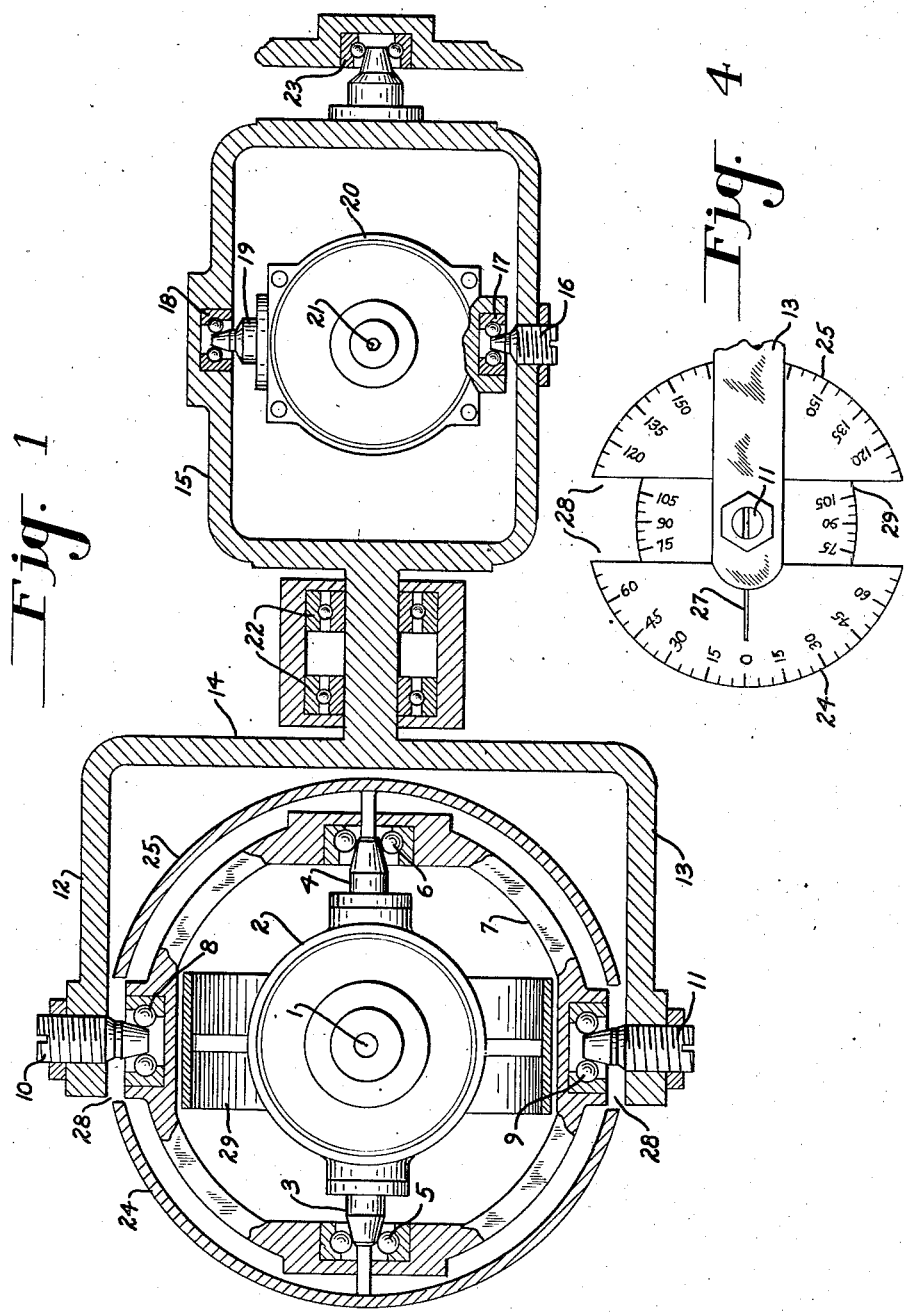
Figure 1 is a longitudinal cross sectional view of the main gyro assembly and indicating dial of the instrument and the auxiliary gyro assembly for stabilizing the third gimbal which pivotally suspends the main gyro outer gimbal.
Figure 2:
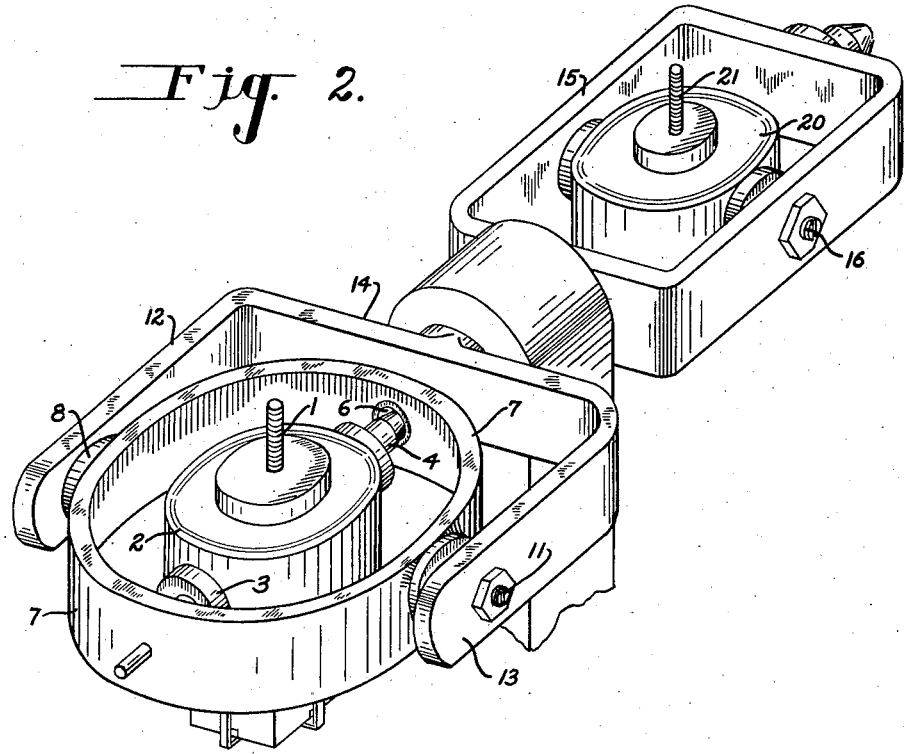
Figure 2 is a view in perspective of that shown in Figure 1.
Figure 3:
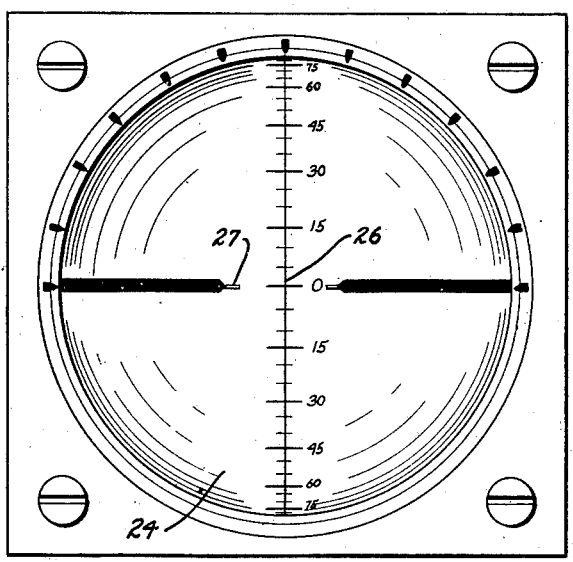
Figure 3 is a view in front elevation of the case and spherical dial of the instrument.

Referring more particularly to the drawings, the main gyro assembly may include a main gyro rotor, not shown, mounted on a vertical spin axis 1 on suitable bearings in a rotor housing, or inner gimbal 2, which, in turn, is provided with trunnions 3 and 4 which rotate in bearing assemblies 5 and 6 in an outer gimbal frame 7 throughout 360° of freedom about an axis at right angles to the spin axis of the rotor. Frame 7 is provided with bearing assemblies 8 and 9 to receive screw trunnions 10 and 11 in forks 12 and 13 of a third gimbal 14 to provide 360° of freedom of movement of frame 7 about an axis at right angles to the rotor spin axis and that of the inner gimbal frame 2. To the third gimbal is either integrally cast or rigidly connected an auxiliary frame 15 carrying a screw trunnion 16 and bearing 17 to receive a bearing 18 and trunnion 19 of housing 20 for an auxiliary rotor with a spin axis 21 parallel to spin axis 1 of the main rotor. For the frames 14 and 15 are provided casing bearings 22 and 23. The axis of auxiliary inner gimbal 20 is parallel to that of the main outer gimbal 7 and the axes of frame 15 and the main third gimbal 14, with its forks 12 and 13, are in alignment.

In this manner the main gyro rotor gyroscopically maintains stable its own assembly including its inner and outer gimbals. The main outer gimbal, instead of being pivoted directly to the casing bearings of an aircraft, or other platform sought to be stabilized, is pivotally suspended in a third gimbal which is pivoted to the aircraft. Thus the aircraft, in assuming various attitudes does not upset the stability of the main gyro assembly. The construction shown in one particular embodiment of the invention in the drawings includes a separate auxiliary gyro assembly in the form of an auxiliary gyro rotor whose spin axis is parallel to that of the main gyro rotor and which has an inner and outer gimbal frame, the latter being rigid with the third gimbal. Thus the auxiliary gyro assembly stabilizes the third gimbal and maintains it normal and perpendicular to the spin axis and the axis of the main outer gimbal.

Use of this new and novel principle of stabilization may be made in any one of a number of devices where such stabilization is of importance and as an example its utility is shown in connection with a new and novel horizon gyro indicating instrument.

The dial for the instrument is preferably in the form of a dial sphere formed of two separated thin-walled shells 24 and 25. Each is formed with indicia including a vertical line 26 and a bisecting horizontal line 27 with gradations reading up from zero in angles of dive and gradations reading down in angles of climb. The bisecting lines and their relative positions with respect to the conventional marks around the circular flat window dial indicate the degree of bank in either direction. The two shells are carried by the main outer gimbal 7 and are thus free to rotate 360° for dive and climb indications. The space 28 between the shells allows the sphere to also rotate 360° for bank indications and the loss of indication degrees due to the space 28 may be supplemented by an indicating strip 29 carried interiorly of bearings 8 and 9.

Thus any movement of the airplane throughout 360° either in pitch or roll or combination thereof will be indicated by the movement of shells 24 and 25 carried by the main outer gimbal 7 while the main gyro rotor stabilizes its own gyro assembly and the auxiliary gyro assembly stabilizes the third gimbal in which the main outer gimbal is pivotally suspended so as to maintain the third gimbal normal to the main rotor spin axis. This prevents such spin axis from becoming aligned with the axis of the main outer gimbal 7.

As stated before, the above described auxiliary gyro assembly for stabilizing the third gimbal is but one embodiment of the invention for accomplishing the underlying new and novel principle of gyro stabilization as is the application of such a principle to a gyro horizon indicator and it is in no way intended to so limit the scope of the new and novel stabilization principle, the manner of its attainment and the utilization thereof for practical purposes.

I claim:

1. In a gyroscopic assembly employing a main rotor, an inner gimbal, a second gimbal for supporting said inner gimbal about an axis at right angles to said rotor spin axis, a third gimbal for supporting said second gimbal about an axis at right angles to that of said inner gimbal and said rotor spin axis, means for pivotally suspending said third gimbal about an axis in alignment with said inner gimbal axis and at right angles to that of said second gimbal and the spin axis of said rotor, gyroscopic means including an auxiliary gyro rotor with an inner and outer gimbal the latter of which is rigid with said third gimbal for stabilizing said third gimbal and maintaining the same normal to said main rotor spin axis.

2. In a gyroscopic assembly employing a main rotor having a vertical spin axis, an inner gimbal, a second gimbal for supporting said inner gimbal about an axis at right angles to said rotor spin axis, a third gimbal for supporting said second gimbal about an axis at right angles to that of said inner gimbal and said rotor spin axis, means for pivotally suspending said third gimbal about an axis in alignment with said inner gimbal axis and at right angles to that of said second gimbal and the spin axis of said rotor, gyroscopic means including an auxiliary gyro rotor with an inner and outer gimbal the latter of which is rigid with said third gimbal for stabilizing said third gimbal and maintaining the same normal to said main rotor spin axis, and maintaining said second gimbal axis out of alignment with said main rotor spin axis.

3. In a gyroscopic device employing a gyro rotor and a gimbal assembly including an inner and a second gimbal frame with axes of suspension at right angles to each other and the spin axis of said rotor for suspending said rotor for spinning about a given axis, a third gimbal for pivotally suspending said second gimbal, said third gimbal being pivotally suspended about an axis in alignment with that of said inner gimbal and gyroscopic means for stabilizing and maintaining said third gimbal normal to the spin axis of said rotor.

4. In a gyroscopic assembly employing a gyro and a gimbal assembly including an inner and a second gimbal frame both mounted for 360° freedom of movement about their respective axes for supporting said rotor for spinning about a given axis, a third gimbal for supporting said second gimbal for 360° freedom about an axis at right angles to the axes of said inner gimbal and rotor, said third gimbal having 360° of freedom in casing bearings in said aircraft about an axis in alignment with that of said inner gimbal, and gyroscopic means connected to said third gimbal to stabilize and maintain the same normal to the rotor spin axis and maintain the latter out of alignment with the axis of suspension of said second gimbal.

5. In a gyroscopic device for maintaining the stability of an aircraft in space, a main gyro rotor and a gimbal assembly including an inner and a second gimbal frame both mounted for 360° freedom of movement about their respective axes for supporting said rotor for spinning about a given axis, a third gimbal for supporting said second gimbal for 360° freedom about an axis at right angles to the line of flight and to the axes of said inner gimbal and rotor, said third gimbal having 360° of freedom in casing bearings about an axis in alignment with that of said inner gimbal, means for stabilizing and maintaining said third gimbal normal to the main rotor spin axis, said means including an auxiliary gyro assembly including a gyro rotor having a spin axis parallel to that of the main rotor carried by an inner gimbal mounted for 360° of freedom about an axis parallel to that of the main second gimbal in an outer gimbal rigid with said third gimbal and carried in casing bearings for 360° of freedom together with said third gimbal.

6. In a gyroscopic device employing a main gyro rotor and a gimbal assembly including an inner and a second gimbal frame both mounted for 360° freedom of movement about their respective axes for supporting said rotor for spinning about a vertical axis, a third gimbal for supporting said second gimbal for 360° freedom about an axis at right angles to the axes of said inner gimbal and rotor, said third gimbal having 360° of freedom in casing bearings about an axis in alignment with that of said inner gimbal, means for stabilizing and maintaining the third gimbal normal to the main rotor spin axis and maintaining said spin axis out of alignment with the axis of suspension of said second gimbal, said means including an auxiliary gyro assembly including a gyro rotor having a spin axis parallel to that of the main rotor carried by an inner gimbal mounted for 360° of freedom about an axis parallel to that of the main second gimbal in an outer gimbal rigid with said third gimbal and carried in casing bearings for 360° of freedom together with said third gimbal.

BOYD G. MARTIN.